(12) United States Patent
Yang

(10) Patent No.: US 6,194,707 B1
(45) Date of Patent: Feb. 27, 2001

(54) AUTOMATIC LASER SHUTDOWN METHOD AND APPARATUS IN OPTICAL TRANSMISSION SYSTEM

(75) Inventor: Ki-Seon Yang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/232,804

(22) Filed: Jan. 19, 1999

(30) Foreign Application Priority Data

Jan. 16, 1998 (KR) .................................................. 98-1115

(51) Int. Cl.[7] ................................................ H04B 10/08
(52) U.S. Cl. ................... 250/227.15; 250/205; 356/73.1; 359/110; 359/177
(58) Field of Search ............................ 250/205, 227.15; 359/110, 143, 155, 177; 356/73.1

(56) References Cited

U.S. PATENT DOCUMENTS

| | | |
|---|---|---|
| 4,739,162 | 4/1988 | Ortiz, Jr. et al. . |
| 4,812,641 | 3/1989 | Ortiz, Jr. . |
| 5,428,471 | 6/1995 | McDermott . |
| 5,491,572 | * 2/1996 | Ohara .................................. 359/110 |
| 5,771,114 | 6/1998 | Andersson et al. . |
| 5,822,112 | 10/1998 | Itou et al. . |

\* cited by examiner

*Primary Examiner*—F L Evans
(74) *Attorney, Agent, or Firm*—Robert E. Bushnell, Esq.

(57) ABSTRACT

An optical transmission system controls an ALS (Automatic Laser Shutdown) function using a message. The optical transmission system includes first and second optical repeaters. The first optical repeater monitors a plurality of optical lines incoming from the second optical repeater to detect a line loss. Upon detection of the line loss, the first optical repeater designates an optical line in an opposite direction of a defective optical line having the line loss, and transmits a request message for performing the ALS function to the second optical repeater through the designated optical line. The request message includes information about the defective optical line. Upon reception of the request message, the second optical repeater analyzes the received request message and performs the ALS function for the defective optical line, and transmits a response message after performing the ALS function to the first optical repeater through an optical line paired with the defective optical line. The first optical repeater then completes the ALS function for the defective optical line, upon reception of the response message.

20 Claims, 7 Drawing Sheets

AUTOMATIC LASER SHUTDOWN METHOD AND APPARATUS IN OPTICAL TRANSMISSION SYSTEM

CLAIM OF PRIORITY

This application makes reference to, incorporates the same herein, and claims all benefits accruing under 35 U.S.C. §119 from an application for AUTOMATIC LASER SHUTDOWN METHOD IN OPTICAL TRANSMISSION SYSTEM earlier filed in the Korean Industrial Property Office on the 16$^{th}$ of January 1998 and there duly assigned U.S. Ser. No. 1115/1998.

BACKGROUND OF THE INVENTION

1. Field of the Invention

The present invention relates to a line loss handling method and apparatus in an optical transmission system, and in particular, to a method for controlling an automatic laser shutdown (ALS) function upon detection of a line loss.

2. Description of the Related Art

An automatic laser shutdown (hereinafter referred to as ALS) function is generally used to automatically shut the laser down in order to protect the eyesight of a worker who repairs a defective optical line between optical repeaters or between an optical repeater and a terminal station in an optical transmission system.

For example, in an optical transmission system exemplary of contemporary practice in the art an optical line between optical repeaters has a line loss, with the optical repeaters having working lines and protection lines in either direction, respectively. In this regard, in a method exemplary of contemporary practice in the art of performing an ALS function specified by ITU-T Recommendation, it is assumed that a first optical line which is a working line in a direction from a second optical repeater to a first optical repeater has the line loss. Upon detection of the line loss on the defective optical line, the first optical repeater determines whether the line loss state continues for a preset time of 550 ms, for example. If the line loss state continues for the preset time 550 ms, the first optical repeater performs line switching to shut down the defective working line. After the line switching, the first optical repeater designates an optical line in an opposite direction of the defective optical line and performs the ALS function for the designated optical line. That is, upon detection of the line loss, the first optical repeater performs the ALS function for an optical line in the opposite direction if the line loss state continues for the exemplary preset time of 550 ms.

Here, the method exemplary of contemporary practice in the art of designating the optical line in the opposite direction can be classified into two methods: the first method exemplary of contemporary practice in the art is to designate a working line in the opposite direction if the defective optical line is the working line and designate a protection line in the opposite direction if the defective optical line is the protection line; and the second method exemplary of contemporary practice in the art is to match the optical lines on the one-to-one basis such that, for example, first and second optical lines are fixedly matched with third and fourth optical lines, respectively.

A description will be made as to an operation of designating the optical line in the opposite direction according to the first method exemplary of contemporary practice in the art and then performing the ALS function. It is assumed that the first and fourth optical lines are set to the working lines W and the second and third optical lines are set to the protection lines P.

Upon detecting a defect on the first optical line (which is the working line) between the second and first optical repeaters, the first optical repeater switches the defective first optical line before performing the ALS function. That is, upon detection of the line loss, the first optical repeater switches the first defective optical line having the line loss from a working state to a protection state before the passage of the exemplary preset time of 550 ms. After the line switching, the first optical repeater performs the ALS function for the protection third optical line in the opposite direction of the switched first optical line to shut down the laser.

Next, a description will be made as to an operation of designating the optical line in the opposite direction according to the second method exemplary of contemporary practice in the art on the assumption that the first and second optical lines are matched with the third and fourth optical lines, respectively, and then performing the ALS function. Upon detecting a defect on the working first optical line between the second and first optical repeaters, the first optical repeater performs the ALS function for the working third optical line matched with the working first optical line to shut down the laser if the line loss on the defective working first optical line continues for the exemplary present time of 550 ms. In the meantime, during the shutdown of the laser, the third and fourth optical lines switch their operating states. Here, in the case that the third optical line is the working line, the third and fourth optical lines make an unnecessary switching, which can cause a deterioration of the system performance.

As the first optical repeater performs the ALS function according to the first or second method exemplary of contemporary practice in the art as stated above, the second optical repeater then recognizes the line loss through the protection third optical line. Subsequently, the second optical repeater shuts down the laser by performing the ALS function for the optical line corresponding to the protection third optical line.

That is, in recognizing the line loss by the first method exemplary of contemporary practice in the art, the ALS function is performed for the protection first optical line paired with the protection third optical line. Also, in recognizing the line loss by the second method exemplary of contemporary practice in the art, the ALS function is performed for the first optical line matched with the third optical line.

As stated above, however, the second method exemplary of contemporary practice in the art can cause an unnecessary switching of the defect-free working third optical line and the defect-free protection fourth optical line, which can deteriorate the transmission performance of the optical transmission system. In addition, assume that the first optical line is in a lock-out state due to its previous transmission state. Here, the lock-out state refers to a state in which the line switching is not performed. That is, the first and second terminal stations perform a compulsory command to prevent the line switching by the internal affairs (e.g., the repeated line switching for a specified time) and the control option, and the state caused by performance of this command is referred to as the lock-out state. For example, if the first terminal station issues a lock-out command to prevent the line switching from the first optical line to the second optical line, the first optical line continues to be a working line and the second optical line continues to be a protection line, until the lock-out state is released. In the lock-out state, the operation result according to the first method exemplary of contemporary practice in the art does not turn out as expected.

The ALS function exemplary of contemporary practice in the art in the optical transmission system which is set to the lock-out state is described as follows. If the first and second terminal stations issue the lock-out command to prevent the switching from the first optical line to the second optical line, the first optical line continues to be a working line serving as a primary channel and the second optical line continues to be a protection line serving as a secondary channel, until the lock-out state is released. Although the first optical repeater should switch, upon detection of the line loss, the defective first optical line having the line loss from the working state to the protection state before the passage of the exemplary preset time of 550 ms, it cannot perform the switching operation because the first optical line continuously maintains the working state. Accordingly, the first optical repeater performs the ALS function for the working fourth optical line in the opposite direction. In the meantime, since the opposite direction is not in the lock-out state, the switching is performed is within 550 ms, for example. Accordingly, even in this case, the third and fourth optical lines are unnecessarily switched, thereby deteriorating the transmission performance of the optical transmission system. The second optical repeater then detects the line loss through the fourth optical line, and upon detection of the line loss, undesirably performs the ALS function for the protection second optical line in the opposite direction to shut down the laser output from the second optical line. Accordingly, although the laser output from the defective first optical line should be shut down, the laser output from the normal second optical line is shut down unexpectedly.

U.S. Pat. No. 4,739,162 to Ortiz Jr. et al., entitled *Laser Beam Injecting System*, discloses a system for injecting successive beam pulses of a pulsed power laser into optical fibers, for transmission therethrough. It is disclosed that the system comprises four lens, four fiber groups with the tips thereof respectively proximate the focal points of the lenses, two galvanometer driven mirrors for directing the laser beam through one of the lenses for focusing onto a selected fiber tip, and control means to drive the galvanometers to reorient the two mirrors between laser beam pulses into successive pairs of predetermined positions effective to inject the successive beam pulses into selected fibers. Failure to reorient the mirrors before the succeeding beam pulse arrives results in laser shutdown. Means are provided for detecting a malfunction of the mirrors, fracture of a lens or a missed fiber injection and, in either case, shutting down the laser.

U.S. Pat. No. 4,812,641 to Ortiz Jr, entitled *High Power Optical Fiber Failure Detection System*, discloses that a break or leak in an optical fiber transmitting high power laser energy, at average power levels sufficient for material processing, is detected promptly and the laser beam delivery system shut down when the optical fiber begins to fail. It is disclosed that photo detectors monitor the laser power out of the fiber and injection power into the fiber, in particular the light intensities in the fiber input and output couplers. A difference in detector outputs, larger than a set threshold to account for inherent fiber losses, is an indication that a break or leak has occurred.

U.S. Pat. No. 5,428,471 to McDermott, entitled *Fail-Safe Automatic Shut-Down Apparatus And Method For High Output Power Optical Communications System*, discloses that in a fiber-optic communications system, a shut-down apparatus in the event of a fiber-optic cable disruption includes a first optical fiber cable for propagating signals in a first direction and having a plurality of adjacent amplifiers disposed along the first cable. It is disclosed that a second optical fiber cable for propagating signals in a second direction, opposite the first direction, includes a plurality of adjacent amplifiers disposed along the second cable. Each of the amplifiers in the second optical fiber cable are interconnected to one of the amplifiers of the first optical fiber cable to form a plurality of amplifier pairs. Circuitry is provided for terminating operation or reducing the output power level of an amplifier within the first or second optical fiber cables in the event of a cable disruption between adjacent amplifier pairs, such that an amplifier within an amplifier pair adjacent to the cable disruption terminates generation or reduces its power level to a safe level at its output. Circuitry is further provided for generating a continuity signal on the first and second cables at the output of each of the amplifiers. Circuitry is provided for sensing the continuity signal upon elimination of the cable disruption to thereby actuate the input of the amplifier within an amplifier pair adjacent to the cable disruption to thereby automatically reestablish communication along the previously disrupted cable.

U.S. Pat. No. 5,771,114 to Andersson, et al., entitled *Optical Interface With Safety Shutdown*, discloses a system for transmitting optical power from a first location to a second location. The system is disclosed to include a first light source at the first location which generates a first light beam. A power converter detects the first light beam at the second location. A first control circuit coupled to the power converter operates a second light source at the second location to generate a return safety light beam after detection of the first light beam. A photodetector detects the return safety light beam at the first location. A second control circuit is coupled between the photodetector and the first light source. The second control circuit detects the presence of the return safety light beam and operates the first light source to generate the first light beam at a first power level prior to detecting the return safety light beam and at a second power level, higher than the first power level, after detecting the return safety light beam.

U.S. Pat. No. 5,822,112 to Itou et al., entitled *Control Apparatus For Optical Amplifier*, discloses a control apparatus for an optical amplifier such as an erbium-doped optical-fiber (EDF) amplifier suppresses overshooting of ALC control at power on and at the time of input light restoration from an off condition, while ensuring quick starting. At power on and at the time of input light restoration from an off condition, an idling current (IDC) reference value generating circuit generates an IDC reference voltage that increases to a value sufficiently greater than a value in a normal operating condition with a time constant corresponding to a rise time of the EDF, and thereby controls a laser diode for pumping the EDF. The voltage can be set to a value larger than the value in the normal operating condition for a predetermined period of time by using a timer.

SUMMARY OF THE INVENTION

It is therefore an object of the present invention to provide a method and apparatus for controlling an automatic laser shutdown (ALS) function using a message.

To achieve the above object and other objects of the present invention, there is provided an automatic laser shutdown method in an optical transmission system including a first optical repeater and a second optical repeater. The method includes the steps of: monitoring, at the first optical repeater, a plurality of optical lines incoming from the second optical repeater to detect a line loss; upon detection of the line loss, designating, at the first optical repeater, an optical line in an opposite direction of a defective optical line having the line loss; transmitting, by the first optical repeater, a request message for performing an automatic laser shutdown (ALS) function to the second optical repeater through the designated optical line, the request message including information about the defective optical line; analyzing, at the second optical repeater, the received request message and performing the ALS function for the defective optical line, upon reception of the request message; transmitting a response message after performing the ALS function from the second optical repeater to the first optical repeater through an optical line paired with the defective optical line; and completing, at the first optical repeater, the ALS function for the defective optical line, upon reception of the response message.

BRIEF DESCRIPTION OF THE DRAWINGS

A more complete appreciation of the invention, and many of the attendant advantages thereof, wil be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
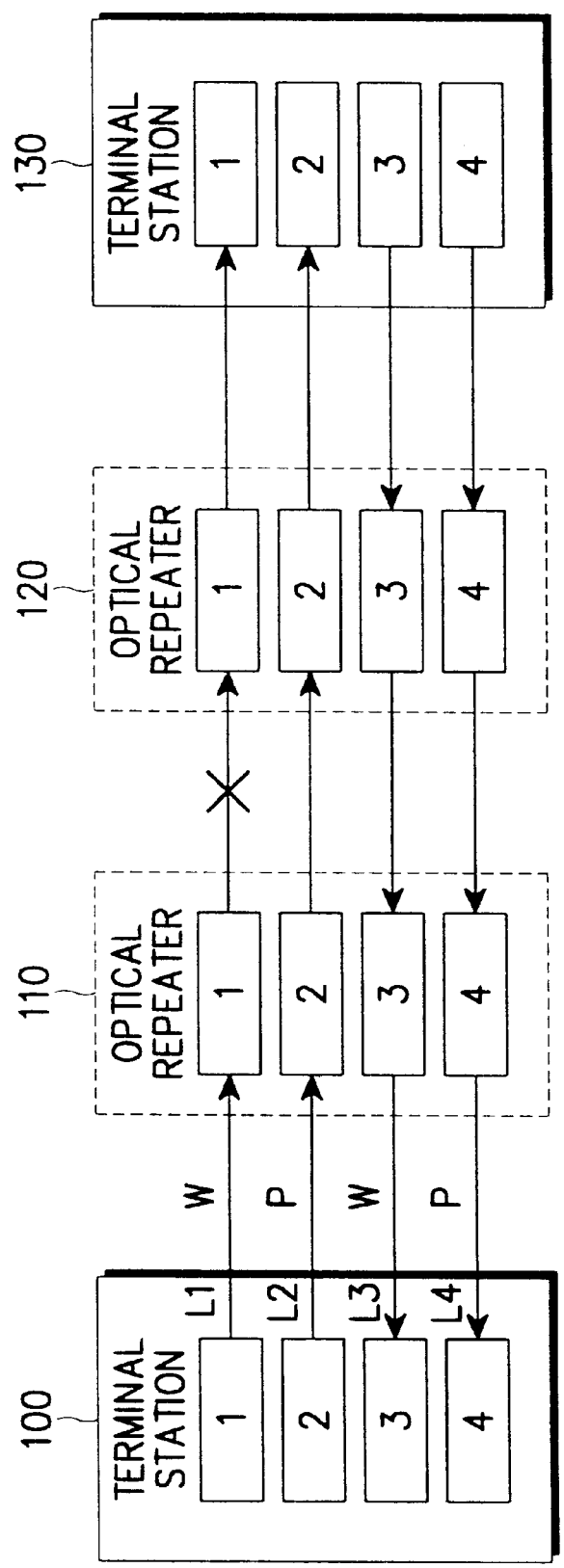
FIG. 1 is a schematic diagram illustrating an optical transmission system with an automatic laser shutdown (ALS) function exemplary of contemporary practice in the art.

FIG. 1 illustrates an optical transmission system exemplary of contemporary practice in the art in which an optical line L1 between optical repeaters 110 and 120 has a line loss, by way of example. The optical repeaters 110 and 120 have working lines W (L1 and L3) and protection lines P (L2 and L4) in either direction, respectively.

Figure 2:
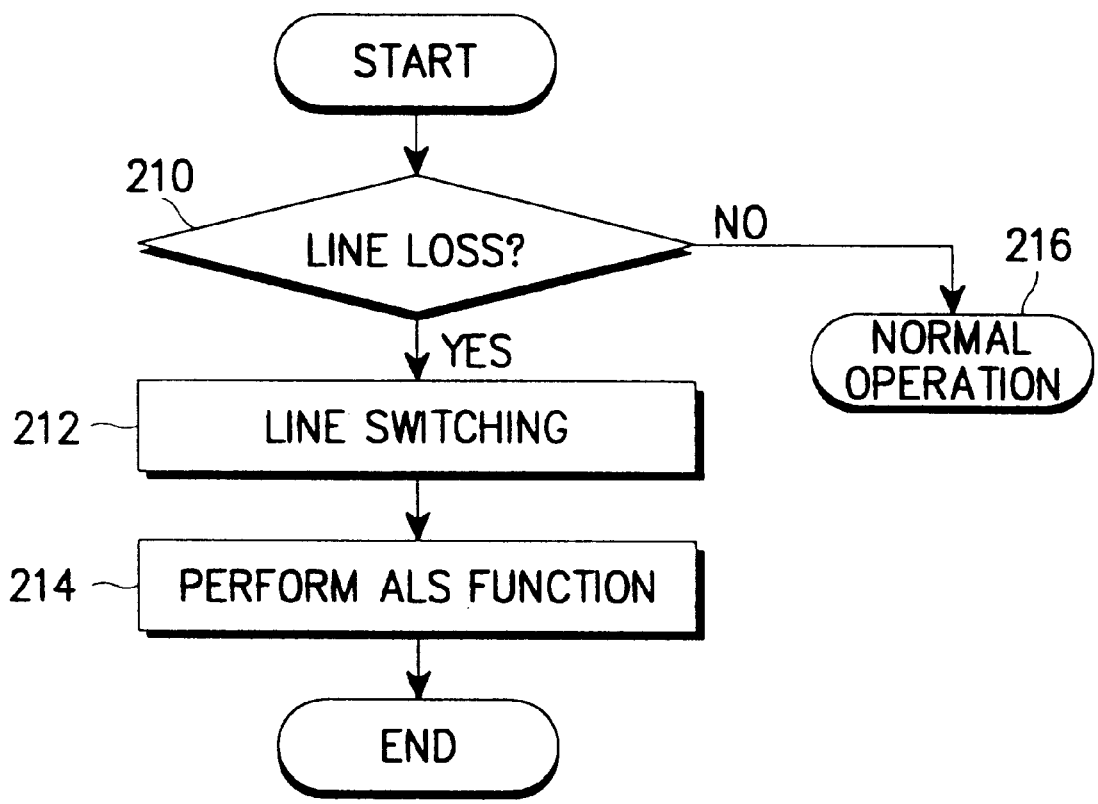
FIG. 2 is a flowchart illustrating a method exemplary of contemporary practice in the art for controlling the ALS function in an optical transmission system.

Now, referring to FIGS. 1 and 2, a method exemplary of contemporary practice in the art of performing an ALS function specified by ITU-T Recommendation will be described, on the assumption that a first optical line L1 which is a working line in a direction from the optical repeater 110 to the optical repeater 120 has the line loss. Upon detection of the line loss on the defective optical line L1, the optical repeater 120 determines whether the line loss state continues for a preset time 550 ms (FIG. 2, Step 210). If the line loss state continues for the preset time of 550 ms, for example, the optical repeater 120 performs line switching to shut down the defective working line L1 (FIG. 2, Step 212). After the line switching, the optical repeater 120 designates an optical line in an opposite direction of the defective optical line L1 and performs the ALS function for the designated optical line (FIG. 2, Step 214). That is, upon detection of the line loss, the optical repeater 120 performs the ALS function for an optical line in the opposite direction if the line loss state continues for 550 ms, for example,. If no line loss is present (FIG. 2, Step 210), normal operation proceeds (FIG. 2, Step 216).

Here, the method exemplary of contemporary practice in the art of designating the optical line in the opposite direction can be classified into two methods: the first method exemplary of contemporary practice in the art is to designate a working line in the opposite direction if the defective optical line is the working line and designate a protection line in the opposite direction if the defective optical line is the protection line; and a second method exemplary of contemporary practice in the art is to match the optical lines L1–L4 on the one-to-one basis such that, for example, the optical lines L1 and L2 are fixedly matched with the optical lines L3 and L4, respectively.

Figure 3:
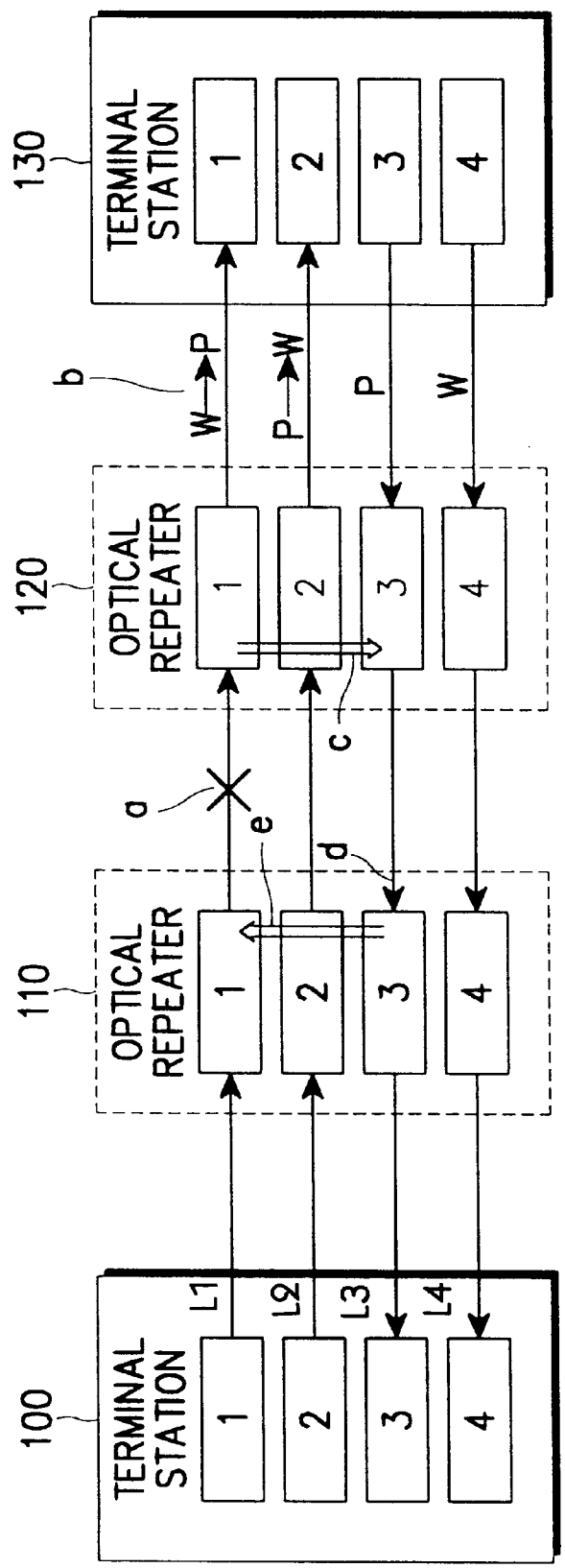
FIG. 3 is a schematic diagram for explaining performance of the ALS function according to a method exemplary of contemporary practice in the art in an optical transmission system.
Figure 4:
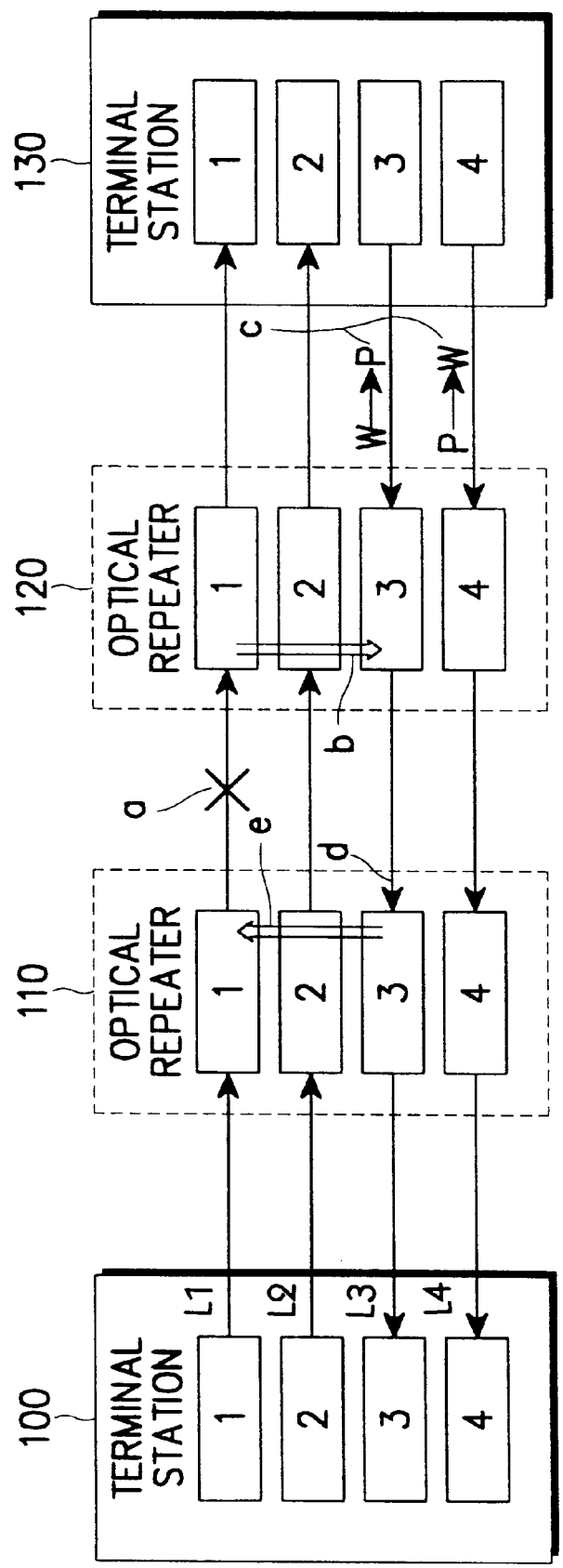
FIG. 4 is a schematic diagram for explaining performance of the ALS function according to another method exemplary of contemporary practice in the art in an optical transmission system.

FIG. 3 illustrates how the optical transmission system performs the ALS function according to the first method exemplary of contemporary practice in the art, and FIG. 4 illustrates how the optical transmission system performs the ALS function according to the second method exemplary of contemporary practice in the art.

First, referring to FIG. 3, a description will be made as to an operation of designating the optical line in the opposite direction according to the first method exemplary of contemporary practice in the art and then performing the ALS function. In FIG. 3, it is assumed that the optical lines L1 and L4 are set to the working lines W and the optical lines L2 and L3 are set to the protection lines P.

Upon detecting a defect (point "a" in FIG. 3) on the optical line L1 (which is the working line) between the optical repeaters 110 and 120, the optical repeater 120 switches the defective optical line L1 before performing the ALS function. That is, upon detection of the line loss, the optical repeater 120 switches the defective optical line L1 having the line loss from a working state to a protection state before the passage of the exemplary preset time of 550 ms (operation "b" in FIG. 3). After the line switching, the optical repeater 120 performs the ALS function for the protection line L3 in the opposite direction of the switched protection line L1 to shut down the laser (operation "c" in FIG. 3).

Next, referring to FIG. 4, a description will be made as to an operation of designating the optical line in the opposite direction according to the second method exemplary of contemporary practice in the art on the assumption that the optical lines L1 and L2 are matched with the optical lines L3 and L4, respectively, and then performing the ALS function.

Upon detecting a defect (point "a" in FIG. 4) on the working line L1 between the optical repeaters 110 and 120, the optical repeater 120 performs the ALS function for the working line L3 matched with the working line L1 to shut down the laser if the line loss on the defective working line L1 continues for the preset time of 550 ms, for example (operation "b" in FIG. 4). In the meantime, during the shutdown of the laser, the optical lines L3 and L4 switch their operating states, optical line L3 switching from a working state to a protection state (W→P) and optical line L4 switching from a protection state to a working state (P→W) (operations "c" in FIG. 4). Here, in the case that the optical line L3 is the working line, the optical lines L3 and L4 make unnecessary switching, which can cause a deterioration of the system performance.

As the optical repeater 120 performs the ALS function according to the first or second method exemplary of contemporary practice in the art as stated above, the optical repeater 110 then recognizes the line loss through the protection line L3 (operations "d" in FIGS. 3 and 4). Subsequently, the optical repeater 110 shuts down the laser by performing the ALS function for the optical line corresponding to the protection line L3.

That is, in recognizing the line loss by the first method exemplary of contemporary practice in the art, the ALS function is performed for the protection line L1 paired with the protection line L3. Also, in recognizing the line loss by the second method exemplary of contemporary practice in the art, the ALS function is performed for the optical line L1 matched with the optical line L3. The operations of recognizing the line loss by the first and second methods exemplary of contemporary practice in the art and performing the ALS function for the defective optical line are represented by "e" in FIGS. 3 and 4, respectively.

As stated above, however, the second method exemplary of contemporary practice in the art can cause an unnecessary switching of the defect-free working line L3 and the defect-free protection line L4, which can deteriorate the transmission performance of the optical transmission system.

In addition, assume that the optical line L1 is in a lock-out state due to its previous transmission state. Here, the lock-out state refers to a state in which the line switching is not performed. That is, the terminal stations 100 and 130 perform a compulsory command to prevent the line switching by the internal affairs (e.g., the repeated line switching for a specified time) and the control option, and the state caused by performance of this command is referred to as the lock-out state. For example, in FIG. 1, if the terminal station 100 issues a lock-out command to prevent the line switching from the optical line L1 to the optical line L2, the optical line L1 continues to be a working line (W) and the optical line L2 continues to be a protection line (P), until the lock-out state is released. In the lock-out state, the operation result according to the first method exemplary of contemporary practice in the art of FIG. 3 does not turn out as expected.

The ALS function exemplary of contemporary practice in the art in the optical transmission system which is set to the lock-out state will be described with reference to FIG. 5.

Figure 5:
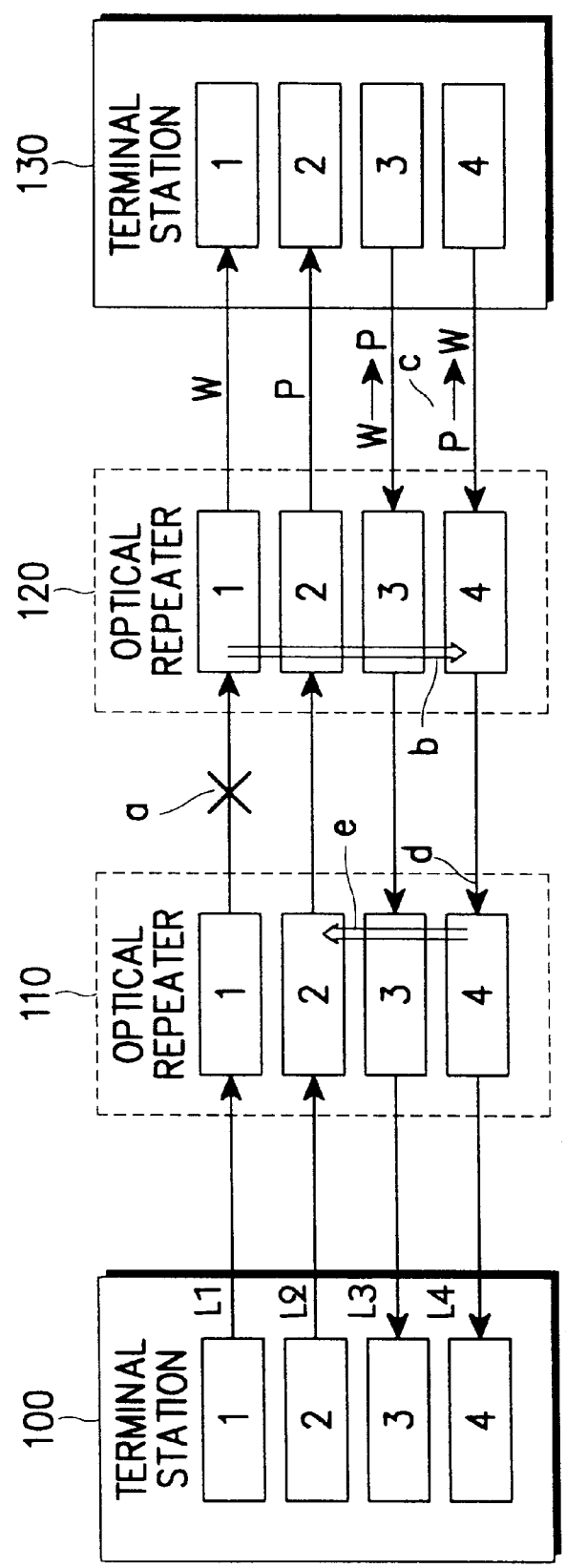
FIG. 5 is a schematic diagram for explaining performance of the ALS function in a lock-out state of an optical transmission system exemplary of contemporary practice in the art.

In FIG. 5, if the terminal stations 100 and 130 issue the lock-out command to prevent the switching from the optical line L1 to the optical line L2, the optical line L1 continues to be a working line (W) serving as a primary channel and the optical line L2 continues to be a protection line (P) serving as a secondary channel, until the lock-out state is released. Although the optical repeater 120 should switch, upon detection of the line loss, the defective optical line L1 having the line loss from the working state to the protection state before the passage of the preset time of 550 ms, for example, it cannot perform the switching operation because the optical line L1 continuously maintains the working state.

Accordingly, the optical repeater 120 performs the ALS function for the working line L4 in the opposite direction (operations "b" and "d" in FIG. 5). In the meantime, since the opposite direction is not in the lock-out state, the switching is performed within 550 ms, for example (operation "c" in FIG. 5). Accordingly, even in this case, the optical lines L3 and L4 are unnecessarily switched, thereby deteriorating the transmission performance of the optical transmission system. The optical repeater 110 then detects the line loss through the optical line L4 by an operation "d" shown in FIG. 5, and upon detection of the line loss, undesirably performs the ALS function for the protection line L2 in the opposite direction to shut down the laser output from the optical line L2 (operation "e" in FIG. 5). Accordingly, although the laser output from the defective optical line L1 should be shut down, the laser output from the normal optical line L2 is shut down unexpectedly.

Figure 6:
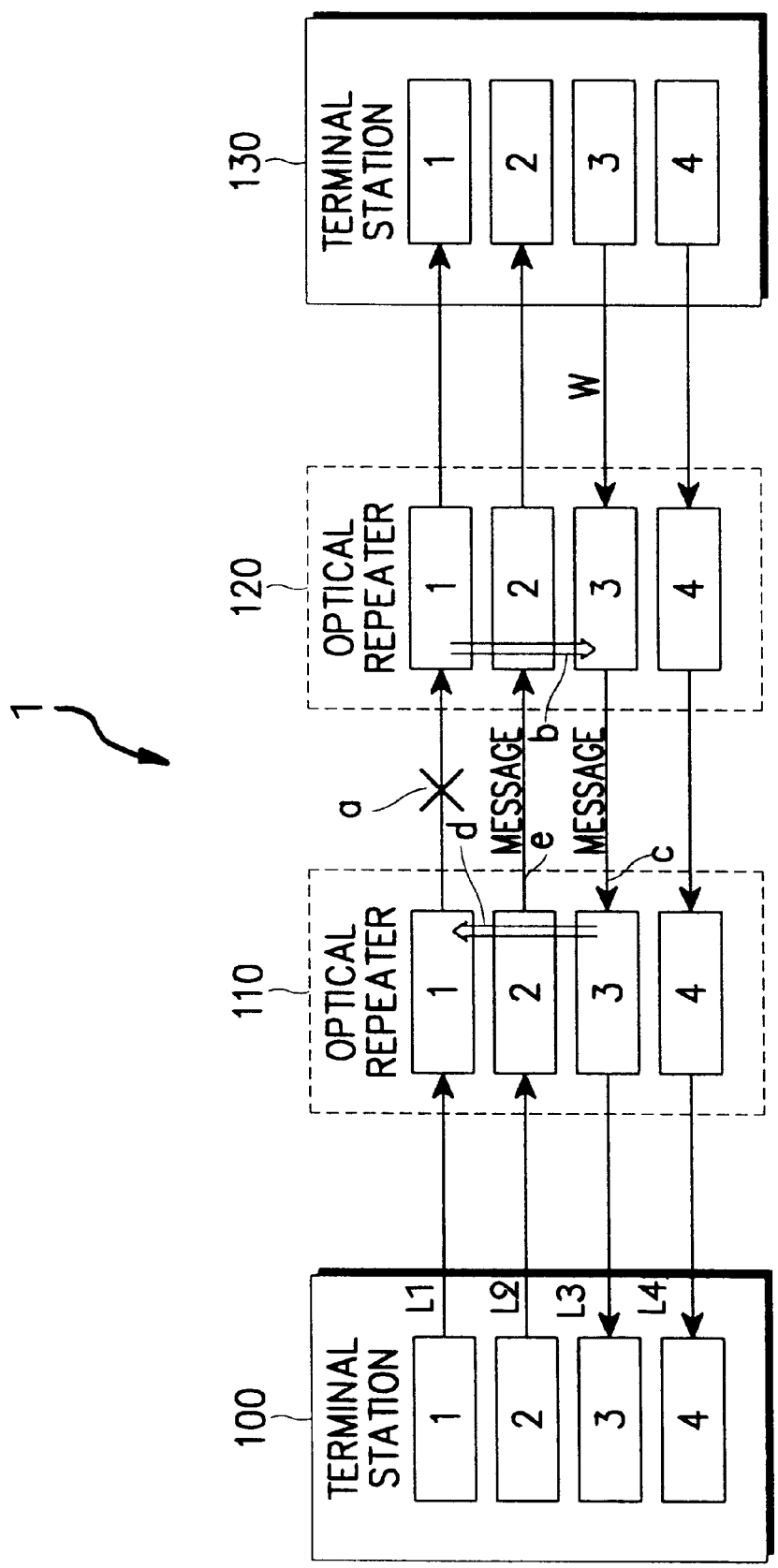
FIG. 6 is a schematic diagram explaining performance of the ALS function in an optical transmission system according to an embodiment of the present invention.
Figure 7:
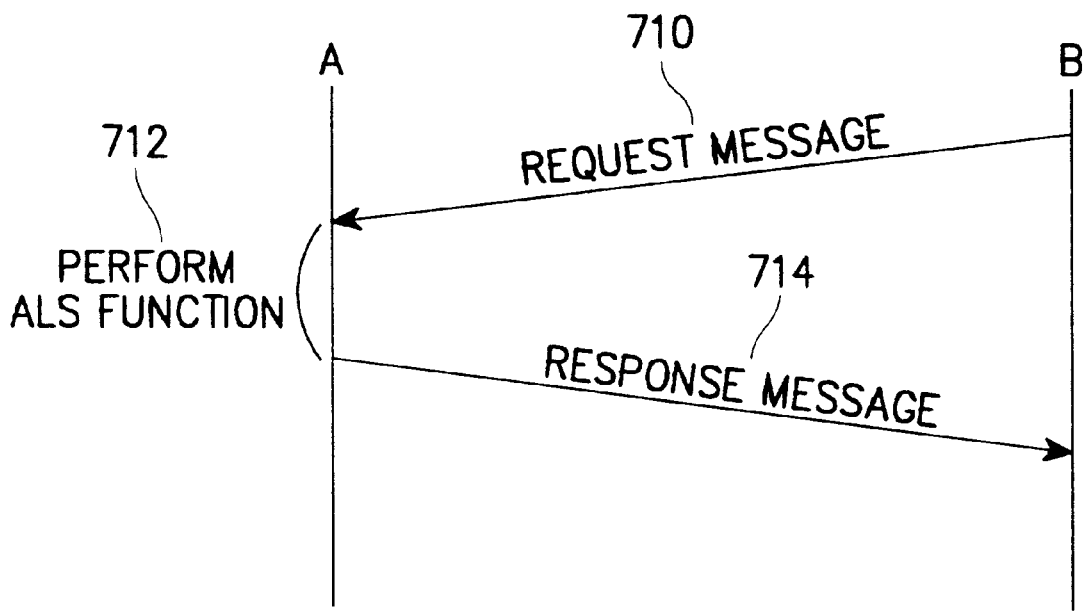
FIG. 7 is a flowchart illustrating a method for controlling the ALS function in an optical transmission system according to an embodiment of the present invention.

Referring to FIGS. 6 and 7, FIG. 6 illustrates how the optical transmission system 1 performs the ALS function according to an embodiment of the present invention, and FIG. 7 illustrates a procedure for controlling the ALS function according to an embodiment of the present invention. The optical transmission system 1 of FIG. 6 includes terminal stations 100 and 130, optical repeaters 110 and 120, and optical lines L1 through L4 for optical transmission between terminal stations 100 and 130 through optical repeaters 110 and 120. The terminal stations 100 and 130 and optical repeaters 110 and 120 have transmission, reception and processing components for optical transmission as known to those skilled in the art. Also, the processors for the optical transmission system 1, particularly for optical repeaters 110 and 120, control optical transmission, automatic laser shutdown (ALS) function, and detection of a line loss in the present invention through appropriate software or programming.

Referring to FIGS. 6 and 7, upon detection of the line loss "a" on the working line L1, the first optical repeater 120 transmits a request message for performing the automatic laser shutdown (ALS) function for the defective optical line L1 to the working line L3 in the opposite direction (operations "b" and "c" in FIG. 6 and Step 710 in FIG. 7). Here, the transmitted request message includes information designating an optical line L3 in an opposite direction to the defective optical line L1 having the line loss. Upon receiving the request message through the optical line L3, the second optical repeater 110 analyzes the received request message and thus, senses the line loss on the optical line L1 and the laser shutdown request for the defective optical line L1. In accordance with the analysis of the received request message, the second optical repeater 110 performs the ALS function for the optical line L1 to shut down the laser output from the optical line L1 (operation "d" in FIG. 6 and Step 712 in FIG. 7). In the meantime, after performing the ALS function, the second optical repeater 110 transmits a response message to the first optical repeater 120 via the optical line L2 paired with the optical line L1 in acknowledgment of the request message (operation "e" in FIG. 6 and Step 714 in FIG. 7). At the first optical repeater 120, the ALS function for the defective optical line L1 is completed, after reception of the response message.

In order to perform the ALS function for a desired optical line using the simple messages as stated above, the following functions can also be performed additionally.

A first additional function is to perform the ALS function for an optical line in the opposite direction, providing for the case that the two optical lines in the same direction are both defective. That is, this function is to provide for the case that two optical lines between the optical repeaters 110 and 120 are both shut down.

A second additional function is to provide for the case that the response message does not reach the other optical repeater for a predetermined time after transmission of the request message for performing the ALS function. In this case, a message informing that the response message does not reach the other optical repeater is transmitted to the terminal station and the ALS function is performed for the working or protection lines in a manner exemplary of contemporary practice in the art.

Finally, it is preferable that the request or response message should be transmitted through a 192 Kbps channel, because the optical transmission system can be mixed, i.e., composed of a 3R repeater and a line repeater. Use of such 192 Kbps channel enables the message interchange between the different optical repeaters using the two channels, since the line repeater performing a simple optical amplification function using an existing analog method has 192 Kbps message channels of 2M monitoring channels and the 3R repeater uses 192 Kbps RSOH DCC channels D1–D3, for example.

As described above, in the present invention it is possible to prevent the unnecessary switching by using the request and response messages, thereby increasing the transmission performance of the optical transmission system. Further, conventionally, when the optical line L3 is defective after the optical lines L1 and L4 are shut down by the ALS function due to the defective optical line L1, all the optical lines L1–L4 typically are shut down. However, in the automatic laser shutdown method and apparatus of the present invention, it is possible to render the optical lines operable in either direction.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An automatic laser shutdown (ALS) method in an optical transmission system, comprising the steps of:
    monitoring, at a first optical repeater, a plurality of optical lines incoming from a second optical repeater to detect a line loss;
    upon detection of the line loss, designating, by the first optical repeater, an optical line in an opposite direction of a defective optical line having the line loss;
    transmitting, by the first optical repeater, a request message for performing an automatic laser shutdown (ALS) function to the second optical repeater through the designated optical line, the request message including information about the defective optical line;
    analyzing, at the second optical repeater, the request message received and performing the automatic laser shutdown (ALS) function for the defective optical line, after reception of the request message;
    transmitting a response message after performing the automatic laser shutdown (ALS) function from the second optical repeater to the first optical repeater through an optical line paired with the defective optical line; and
    completing, at the first optical repeater, the automatic laser shutdown (ALS) function for the defective optical line, after reception of the response message.

2. The method as claimed in claim 1, wherein the first optical repeater is different from the second optical repeater.

3. The method according to claim 2, wherein at least one of the request message and the response message is transmitted through a 192 Kbps channel.

4. The method according to claim 3, wherein the request message is transmitted through a first channel and the response message is transmitted through a second channel.

5. The method according to claim 2, wherein the request message is transmitted through a first channel and the response message is transmitted through a second channel.

6. The method according to claim 1, wherein at least one of the request message and the response message is transmitted through a 192 Kbps channel.

7. The method according to claim 6, wherein the request message is transmitted through a first channel and the response message is transmitted through a second channel.

8. The method according to claim 1, wherein the request message is transmitted through a first channel and the response message is transmitted through a second channel.

9. An automatic laser shutdown (ALS) method in an optical transmission system, comprising the steps of:
    monitoring, at a first optical repeater, a plurality of optical lines incoming from a second optical repeater to detect a line loss;
    upon detection of the line loss, designating, by the first optical repeater, an optical line in an opposite direction of a defective optical line having the line loss;
    transmitting, by the first optical repeater, a request message for performing an automatic laser shutdown (ALS) function to the second optical repeater through the designated optical line, the request message including information about the defective optical line; and
    analyzing, at the second optical repeater, the request message received and performing the automatic laser shutdown (ALS) function for the defective optical line, after reception of the request message.

10. The method according to claim 9, further comprising the step of transmitting a response message after performing the automatic laser shutdown (ALS) function from the second optical repeater to the first optical repeater through an optical line paired with the defective optical line.

11. The method according to claim 9, further comprising the step of completing, at the first optical repeater, the automatic laser shutdown (ALS) function for the defective optical line.

12. The method according to claim 9, wherein the first optical repeater is different from the second optical repeater.

13. The method according to claim 10, wherein the first optical repeater is different from the second optical repeater.

14. The method according to claim 13, wherein at least one of the request message and the response message is transmitted through a 192 Kbps channel.

15. The method according to claim 14, wherein the request message is transmitted through a first channel and the response message is transmitted through a second channel.

16. The method according to claim 10, wherein at least one of the request message and the response message is transmitted through a 192 Kbps channel.

17. The method according to claim 10, wherein the request message is transmitted through a first channel and the response message is transmitted through a second channel.

18. An optical transmission system for automatic laser shutdown (ALS), comprising:

a first optical repeater, the first optical repeater for monitoring a plurality of incoming optical lines to detect a line loss, for designating an optical line in an opposite direction of a defective optical line having the line loss, and for transmitting a request message for performing an automatic laser shutdown (ALS) function through the designated optical line, the request message including information about the defective optical line; and a second optical repeater, the second optical repeater for analyzing the request message received from the first optical repeater and for performing the automatic laser shutdown (ALS) function for the defective optical line, after reception of the request message from the first optical repeater.

19. The optical transmission system as claimed in claim 18, wherein the second optical repeater is also for transmitting a response message after performing the automatic laser shutdown (ALS) function to the first optical repeater through an optical line paired with the defective optical line.

20. The optical transmission system as claimed in claim 19, wherein the first optical repeater is also for completing the automatic laser shutdown (ALS) function for the defective optical line, after reception of the response message from the second optical repeater.

* * * * *